United States Patent [19]

Bottieri, Jr.

[11] Patent Number: 4,484,667

[45] Date of Patent: Nov. 27, 1984

[54] SHIELD PLATE IN WHEEL AND DISC BRAKE ASSEMBLY

[76] Inventor: Joseph B. Bottieri, Jr., 1111 Crandon Blvd., Key Biscayne, Fla. 33149

[21] Appl. No.: 424,155

[22] Filed: Sep. 27, 1982

[51] Int. Cl.$^3$ ............................................ F16D 65/00
[52] U.S. Cl. ............................................ 188/218 A
[58] Field of Search ............... 188/17, 18 R, 18 A, 188/71.6, 218 A, 218 R, 264 AA; 192/112; 301/9 DN, 6 R, 6 S, 6 W, 6 WB, 37 PB, 37 S

[56] References Cited

U.S. PATENT DOCUMENTS

| | | | |
|---|---|---|---|
| 1,864,969 | 6/1932 | White | 188/218 A |
| 1,931,946 | 10/1933 | Zerk | 301/37 S |
| 2,003,109 | 5/1935 | Farr | 301/6 WB |
| 2,071,280 | 2/1937 | Eksergian | 301/6 R |
| 2,590,363 | 3/1952 | Adair | 301/9 DN |
| 2,945,723 | 7/1960 | Estes | 301/37 PB |
| 2,952,339 | 9/1960 | Felts | 188/218 A |
| 4,005,768 | 2/1977 | Bubnash et al. | 188/218 A |
| 4,207,971 | 6/1980 | Ishikawa et al. | 188/218 A |

FOREIGN PATENT DOCUMENTS 2821646 11/1979 Fed. Rep. of Germany .... 301/37 S
WO81/03530 12/1981 PCT Int'l Appl. ............ 188/218 A

*Primary Examiner*—Douglas C. Butler
*Assistant Examiner*—R. R. Diefendorf
*Attorney, Agent, or Firm*—Oltman and Flynn

[57] ABSTRACT

A dust shield plate is clamped between the spider of an automotive vehicle wheel and the rotor of a disc brake for that wheel. This plate covers the axially inboard side of the wheel spider and prevents dust given off by the disc brake from getting on the wheel at the axially outboard side of the wheel spider. The shield plate has a circular peripheral edge which slidably engages the inside of the wheel at its tire-supporting rim and circumferentially spaced slits extending inward from this edge to provide flexible and resilient fingers in succession along the periphery. This enables the shield plate to be slidably inserted into wheels with somewhat different inside diameters.

The shield plate has seven arcuate openings enabling it to be mounted on a wheel with four or five wheels studs or four wheels studs and two guide pins.

5 Claims, 5 Drawing Figures

U.S. Patent  Nov. 27, 1984  4,484,667

SHIELD PLATE IN WHEEL AND DISC BRAKE ASSEMBLY

SUMMARY OF THE INVENTION

One of the problems with disc brakes on cars, particularly certain foreign cars, is that during braking a substantial amount of friction material is given off by the brakes and ends up on the axially outboard side of the wheels, leaving a coating which detracts from the car's appearance.

The present invention is directed to a wheel and disc brake assembly which incorporates in a novel manner a shield plate which prevents dust given off by the brake pads from reaching the visible side of the wheel.

In accordance with a presently-preferred embodiment of the invention, a thin shield plate is installed inside the wheel and becomes clamped between the brake rotor and the spider of the wheel at the axially inboard side of the spider. It covers the inside of the wheel at the inboard side of the wheel spider so as to prevent braking dust from reaching the wheel on the outboard side of the wheel spider. The shield plate has slits extending in from its periphery to provide flexible and resilient fingers which facilitate snug reception in a wheel whose inside diameter may deviate from its nominal value. The shield plate has openings for passing different numbers of wheel studs on which nuts are mounted to clamp the wheel and shield plate to the brake rotor.

A principal object of this invention is to provide an improved shield plate for preventing dust produced by the brake from being deposited on a visible portion of the wheel.

Another object of this invention is to provide such a shield plate which may be used on various wheels whose inside diameter might deviate from the nominal size.

Further objects and advantages of this invention will be apparent from the following detailed description of a presently-preferred embodiment thereof, which is shown in the accompanying drawing.

Before explaining in detail the illustrated embodiment of the invention, it is to be understood that the invention is not limited to the details of the particular arrangement shown but is capable of other embodiments. Also, the terminology used herein is for the purpose of description and not of limitation.

DETAILED DESCRIPTION

Figure 2:
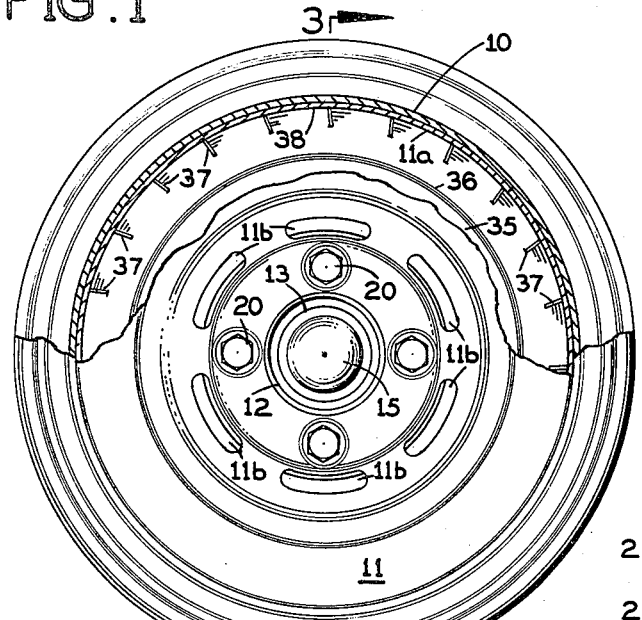
FIG. 2 is an outer end view of a wheel and disc brake assembly incorporating the present shield plate and having the wheel mounted by four studs and nuts.
Figure 3:
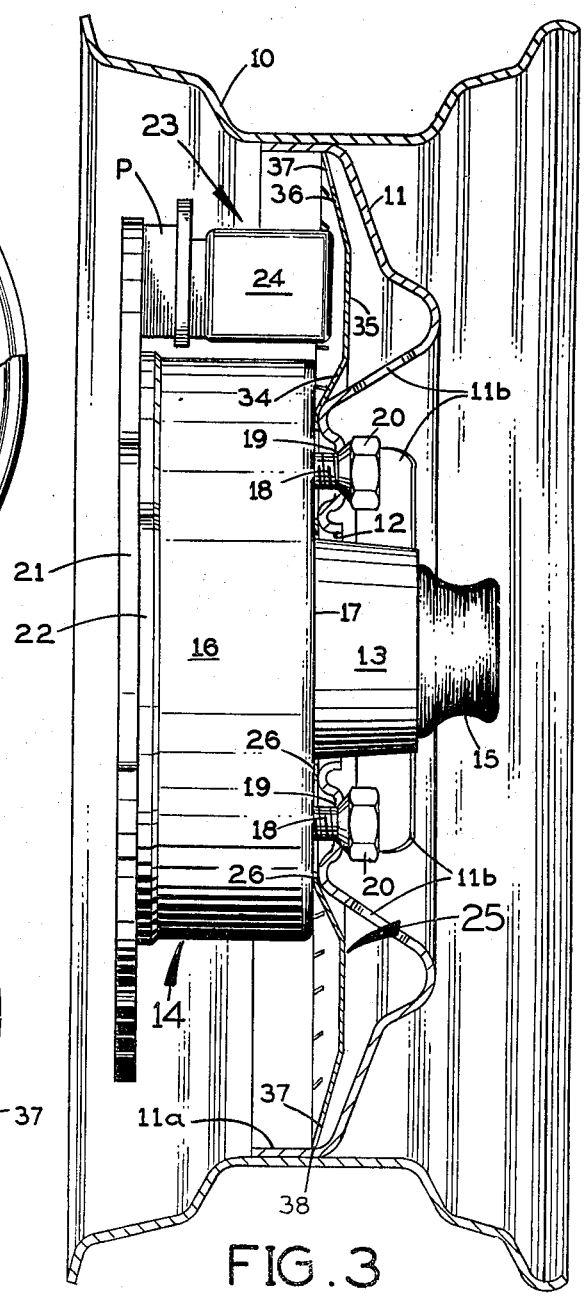
FIG. 3 is a longitudinal section through this assembly taken along the line 3—3 in FIG. 2.

Referring to FIG. 3, the present assembly includes a car wheel and a disc brake of conventional design. The right side is the axially outboard, visible side of the wheel in FIG. 3. The wheel has an annular rim 10 which carries an inflatable tire (not shown) and a spider 11 with a cylindrical outer flange 11a which is rigidly attached to the inside of the rim and extends transversely inward from it in a generally radial direction. The wheel spider has a central opening 12 which extends in spaced relation around the hub 13 of the brake rotor 14. The wheel spider also is formed with a plurality of circumferentially spaced, arcuate openings 11b (FIG. 2).

At the axially outboard (right) side of the wheel spider 11 in FIG. 3 the brake rotor carries a cap 15 which covers the end of the stub shaft (not shown) of the steering knuckle on which the brake rotor is rotatably mounted by anti-friction bearings. At the axially inboard (left) side of the wheel spider 11 in FIG. 3 the brake rotor 14 presents a cylindrical side wall 16 of substantially larger diameter than the central opening 12 in the spider 11 of the wheel. This cylindrical side wall 16 is joined integrally to the hub 13 of the brake rotor by a flat, annular, transverse wall 17 extending radially between them.

A plurality of circumferentially spaced, screw-threaded wheel studs 18 extend axially outward from the transverse wall 17 of the brake rotor. These studs pass loosely through corresponding openings 19 in the wheel spider 11. Nuts 20 threaded onto the wheel studs 18 clamp the brake rotor 14 to the wheel. Depending upon the vehicle, there may be four wheel studs 18 at 90° intervals circumferentially or five at 72° intervals circumferentially.

A brake disc 21 is affixed to a slightly enlarged segment 22 of the brake rotor 14 at the axially inboard end of its cylindrical side wall 16. A disc brake caliper 23 carries frictional wear pads for engagement with the brake disc 21 in a known manner. The brake caliper is suitably mounted on the vehicle so as to remain stationary while the wheel 10, 11, the brake rotor 14 and brake disc 21 rotate in unison. As shown in FIG. 3, the axially outboard end 24 of the brake caliper projects slightly beyond the outboard facing wall 17 of the brake rotor.

Figure 1:
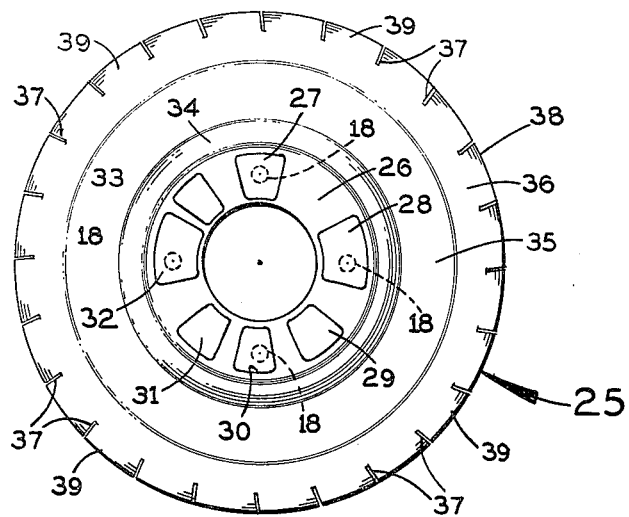
FIG. 1 is a front elevational view of a shield plate in accordance with the present invention.
Figure 4:
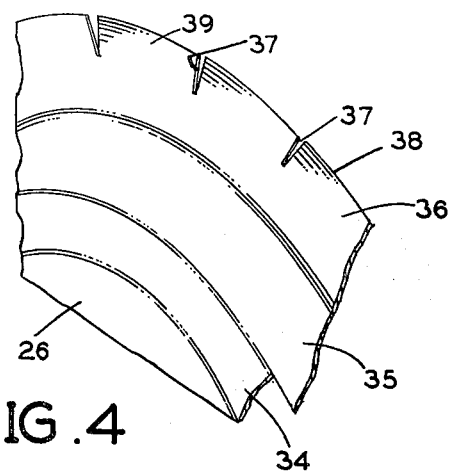
FIG. 4 is a fragmentary perspective section showing part of the present shield plate in enlarged detail.

In accordance with the present invention, a thin annular shield plate 25 as shown in FIG. 1 is mounted in the wheel and then clamped between the wheel spider 11 and the transverse wall 17 of the brake rotor. As shown in FIG. 3, this shield plate has a flat annular central segment 26 which is clamped against the brake rotor wall 17 by the wheel spider 11. This central segment of the shield plate extends radially of the wheel and is formed wit seven openings, as shown at 27, 28, 29, 30, 31, 32 and 33 in FIG. 1, for passing the wheel studs 28, as explained hereinafter. The radially outward edge of central segment 26 of the shield plate is joined integrally to an inner conical segment 34, which is inclined axially outward at an angle of about 60° to the axis of the wheel. The outer edge of segment 34 is joined integrally to a flat, annular, intermediate segment 35 which extends radially outward and is joined integrally at its outer edge to an outer conical segment 36. This outer segment 36 is inclined axially inboard and radially outward (i.e., opposite to the inclination of the inner conical segment 34). With this construction, the radial segment 35 and the outer conical segment 36 of the shield plate are offset axially outboard to provide a clearance for the projecting end 24 of brake caliper 23.

In accordance with this invention, the outer segment 36 of the shield plate is formed with slits 37 extending inward from its circular outer edge 38 to provide flexible and resilient arcuate fingers 39 which facilitate the insertion of the shield plate 25 into wheels whose dimensions may vary somewhat from one wheel to another. As shown in FIG. 3, the circular outer edge 38 of the shield plate engages the inside of the cylindrical outer flange 11a of the wheel spider. The peripheral fingers 39 between the slits in the shield plate are flexible enough to permit the slidable insertion of the shield plate into the wheel spider flange 11a even if the latter has a slightly different inside diameter than another wheel of the same nominal size. Such dimensional discrepancies may be caused by manufacturing variations among wheels produced by a single manufacturer or by variations between the same nominal sized wheels of different manufacturers.

As shown in FIG. 3, the shield plate extends completely across the axially inboard face of the wheel spider 111 where the latter would otherwise be exposed to dust produced by the disc brake when it is applied. The shield plate prevents such dust from escaping through the openings 11b in the wheel spider and lodging on the wheel at the axially outboard side of the wheel spider. There is no clearance between the outer edge 38 of this plate and the inside of the wheel so that virtually no dirt or water can escape axially outboard past the shield plate.

Figure 5:
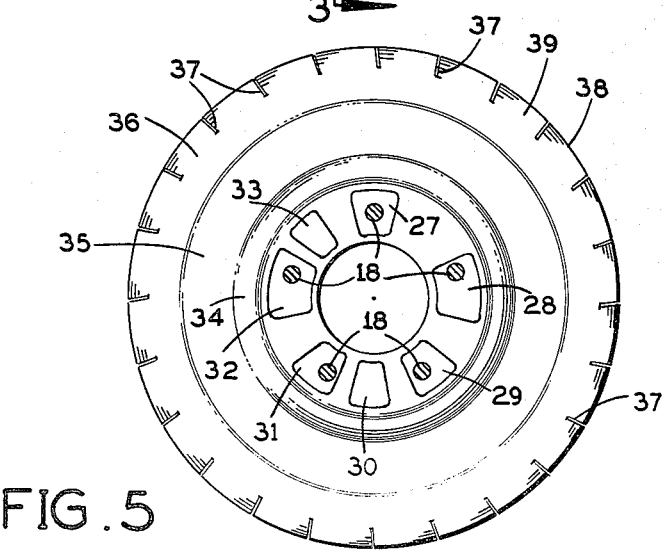
FIG. 5 is an elevational view of the present shield plate with five mounting studs and nuts for the wheel.

Another important aspect of the present invention is that the seven openings 27-33 in the shield plate have respective arcuate extents and are so located as to enable the present shield plate to be mounted on several different types of passenger car wheels. For example, as shown in FIG. 1, the wheel may have four wheel studs 18 arranged circularly at 90° intervals and passing through the openings 27, 28, 30 and 32 in the shield plate. Another type of car wheel has two guide pins in addition to the four wheel studs, and these guide pins would be received in the shield plate openings 29 and 33 in FIG. 1. FIG. 5 shows how the shield plate would be mounted on still another type of car wheel, which has five wheel studs arranged circularly at 72° intervals and passing through the shield plate openings 27, 28, 29, 31 and 32.

From FIGS. 1 and 5 it will be evident that openings 28 and 32 are equally spaced arcuately on opposite sides of openings 27 and each is long enough arcuately that it extends to less than 72° from opening 27 and more than 90° from opening 27. Opening 29 is within less than 72° of openings 28 on the opposite side of opening 28 from opening 27, and this is also true of opening 31 in relation to opening 32. Opening 30 is diametrically opposite opening 27. Opening 33 is diametrically opposite opening 29.

I claim:

1. In combination with
   a vehicle wheel having an annular tire support rim and a spider extending inward from the rim transverse to the axis of the wheel, said spider having a plurality of openings therein spaced inward from the rim, and
   a disc brake having a caliper with a brake pad and a brake rotor clamped to the wheel spider and carrying a brake disc spaced axially inboard from the wheel spider and facing the spider,
   the improvement which comprises a shield plate clamped between the wheel spider and the brake rotor axially outboard from the brake disc, said shield plate radially outward from its clamping engagement with the brake rotor covering the axially inboard side of the wheel spider to prevent the escape of friction-generated braking dust from the brake through the wheel spider onto the wheel at the axially outboard side of the wheel spider, and said shield plate having a circular peripheral edge which slidably engages the inside of the wheel at said tire support rim and circumferentially spaced slits extending inward from said peripheral edge to provide flexible and resilient fingers in succession along the periphery of the shield plate.

2. A dust shield plate for use with
   a vehicle wheel having an annular tire support rim and a spider extending inward from the rim transverse to the axis of the wheel, said spider having a plurality of openings therein spaced inward from the rim, and
   a disc brake having a caliper with a brake pad and a brake rotor clamped to the wheel spider and carrying a brake disc spaced axially inboard from the wheel spider and facing the spider,
   said shield plate having a central portion for clamping engagement between the wheel spider and the brake rotor axially outboard from the brake disc, said shield plate having an imperforate portion extending radially outward from its central portion to cover the axially inboard side of the wheel spider and thereby prevent friction generated braking dust from depositing on the axially outboard side of the wheel spider, and said shield plate having a circular peripheral edge for slidable engagement with the inside of the wheel at said tire support rim and circumferentially spaced slits extending inward from said peripheral edge to provide flexible and resilient fingers in succession along the periphery of the shield plate.

3. A shield plate according to claim 2 and having openings arranged to selectively pass (a) four wheel studs or (b) five wheel studs or (c) four wheel studs and two guide pins projecting axially outward from the brake rotor for attaching the wheel spider to the brake rotor.

4. A shield plate according to claim 3, wherein said openings comprise:
   five arcuate openings located at 72° intervals circularly; and
   two additional arcuate openings respectively located diametrically opposite two of said five openings.

5. A dust shield plate for use with
   a vehicle wheel having an annular tire support rim and a spider extending inward from the rim transverse to the axis of the wheel, said spider having a plurality of openings therein spaced inward from the rim, and
   a disc brake having a caliper with a brake pad and a brake rotor clamped to the wheel spider and carrying a brake disc spaced axially inboard from the wheel spider and facing the spider,
   said shield plate having a central portion for clamping engagement between the wheel spider and the brake rotor axially outboard from the brake disc, said shield plate having an imperforate portion extending radially outward from its central portion to cover the axially inboard side of the wheel spider and thereby prevent friction generated braking dust from depositing on the axially outboard side of the wheel spider, and said shield plate having openings arranged to selectively pass (a) four wheel studs or (b) five wheel studs or (c) four wheel studs and two guide pins projecting axially outward from the brake rotor for attaching the wheel spider to the brake rotor.

* * * * *